(12) United States Patent
Kruglick et al.

(10) Patent No.: US 9,266,201 B2
(45) Date of Patent: Feb. 23, 2016

(54) SYSTEM TO FACILITATE DISASSEMBLY OF COMPONENTS

(71) Applicant: Empire Technology Development LLC, Wilmington, DE (US)

(72) Inventors: Ezekiel Kruglick, Poway, CA (US); Mark Meloni, Longmont, CO (US)

(73) Assignee: Empire Technology Development LLC, Wilmington, DE (US)

(*) Notice: Subject to any disclaimer, the term of this patent is extended or adjusted under 35 U.S.C. 154(b) by 0 days.

(21) Appl. No.: 14/043,836

(22) Filed: Oct. 1, 2013

(65) Prior Publication Data

US 2014/0026404 A1 Jan. 30, 2014

Related U.S. Application Data (62) Division of application No. 12/995,440, filed as application No. PCT/US2010/037575 on Jun. 7, 2010, now Pat. No. 8,572,831.

(51) Int. Cl.
*H05B 6/00* (2006.01)
*B23P 19/04* (2006.01)
(Continued)

(52) U.S. Cl.
CPC ............... *B23P 19/04* (2013.01); *H05B 6/105* (2013.01); *F16B 17/002* (2013.01); *Y10T 29/49815* (2015.01); *Y10T 29/49822* (2015.01); *Y10T 29/53* (2015.01); *Y10T 428/24521* (2015.01)

(58) Field of Classification Search
CPC ... H05K 13/00; H05K 13/0023; H05K 13/04; H05K 13/08; B23P 19/04; F16B 17/002; H05B 6/105; Y10T 29/53; Y10T 29/49822
See application file for complete search history.

(56) References Cited

U.S. PATENT DOCUMENTS

| 4,483,341 A | 11/1984 | Witteles |
| 5,808,863 A | 9/1998 | Radloff et al. |
| 6,033,684 A | 3/2000 | Norcia |

(Continued)

FOREIGN PATENT DOCUMENTS

| CA | 2385554 A1 | 3/2001 |
| CA | 2506745 A1 | 6/2004 |

(Continued)

OTHER PUBLICATIONS

Acumen Hydration Calculators, http://www.acumeninc.com/ProductTechnology.aspx?tld=2; published as website in 1999.

(Continued)

*Primary Examiner* — Carl Arbes
(74) *Attorney, Agent, or Firm* — Turk IP Law, LLC (57) ABSTRACT

Technologies are generally described for providing inductively removable assembly bonding. Inductive elements may be placed strategically at bonding locations between two or more coupled components. At disassembly time, the elements may be heated through Radio Frequency (RF) energy causing the bonds to break and components to separate. For example, inductive elements placed near plastic stake bonds between dissimilar materials in an electronic device may be employed to separate the dissimilar materials during a recycling process. According to some examples, the elements may also be heated through a directly applied electric current via a network of connections designed into the assembly.

16 Claims, 9 Drawing Sheets

(51) Int. Cl.
*H05B 6/10* (2006.01)
*F16B 17/00* (2006.01)

(56) References Cited

U.S. PATENT DOCUMENTS

| | | | |
|---|---|---|---|
| 6,348,679 | B1 | 2/2002 | Ryan et al. |
| 6,407,555 | B2 | 6/2002 | Joshi et al. |
| 6,617,557 | B1 | 9/2003 | Ryan et al. |
| 7,033,321 | B1 | 4/2006 | Sarvazyan |
| 7,171,252 | B1 | 1/2007 | Scarantino et al. |
| 7,549,987 | B2 | 6/2009 | Shadduck |
| 7,558,622 | B2 | 7/2009 | Tran |
| 7,638,341 | B2 | 12/2009 | Rubinsky et al. |
| 2001/0035406 | A1 | 11/2001 | Ryan et al. |
| 2002/0079121 | A1 | 6/2002 | Ryan et al. |
| 2003/0170092 | A1 | 9/2003 | Chiodo et al. |
| 2004/0060918 | A1 | 4/2004 | Woodlief et al. |
| 2004/0159654 | A1 | 8/2004 | Ryan et al. |
| 2006/0019510 | A1 | 1/2006 | Rudduck et al. |
| 2012/0011692 | A1 | 1/2012 | Kruglick et al. |

FOREIGN PATENT DOCUMENTS

| | | | |
|---|---|---|---|
| CN | 1491754 A | | 4/2004 |
| CN | 1889588 A | * | 1/2007 |
| EP | 1548081 A2 | | 6/2005 |
| JP | 2002276623 A1 | | 9/2002 |
| WO | WO9947621 | | 9/1999 |
| WO | WO0121725 | | 3/2001 |
| WO | 01/46597 A1 | | 6/2001 |
| WO | WO0146597 | | 6/2001 |
| WO | WO2004010011 | | 1/2004 |
| WO | WO2004004658 | | 6/2004 |
| WO | WO2008148067 | | 12/2008 |
| WO | WO2009027898 | | 3/2009 |

OTHER PUBLICATIONS

Takahiro Sunaga et al., "Measurement of the Electrical Properties of Human Skin and the Variation Among Subjects with Certain Skin Conditions"; 2002 Phys. Med. Biol., 47 N11-N1, Published Nov. 29, 2001. http://www.iop.org/EJ/abstract/0031-9155/47/1/402.

H.P. Schwan, "Electrical and Acoustic Properties of Biological Materials and Biomedical Applications"; IEEE Transactions on Biomedical Engineering, vol. BME-31, No. 12, Dec. 1984.

P. Alexander Derchak PhD, "LifeShirt® System as a Monitor of Heat Stress and Dehydration"; VivoMetrics, Inc.; Ventura, CA, Feb. 2004.

G. Marchand et al., "Development of a Dehydration Sensor Integrated on Fabric", Wearable and Implantable Body Sensor Networks; International Workshop, pp. 230-233, 2009 Sixth International Workshop on Wearable and Implantable Body Sensor Networks. Conference Date Jun. 3-5, 2009.

Duflou, J.R. et al., "Towards Self-Disassembling Products: Design Solution for Economically Feasible Large-Scale Disassembly" in "Innovation in Life Cycle Engineering and Sustainable Development", Springer (2006) Edited by Brissaud, D. et al., ISBN 1402046014.

WESCO, "Paint Body Equipment", Copyright WESCO Corp. 2011, Web site last updated on Mar. 28, 2012, accessed at: http://www.wescopbe.com/heat_induction.htm.

F. Jaspard et al., "Dielectric Properties of Blood: an Investigation of Haematocrit Dependence"; 2003 Physiol. Meas., 24 137-147.

International Search Report & Written Opinion for PCT/US10/37575 filed Jun. 7, 2010, mailing date Aug. 27, 2010.

* cited by examiner

SYSTEM TO FACILITATE DISASSEMBLY OF COMPONENTS

CROSS-REFERENCE TO RELATED APPLICATIONS

This Application is a divisional under 35 U.S.C §121 of and claims priority to U.S. patent application Ser. No. 12/995,440 filed on Nov. 30, 2010 and patented as U.S. Pat. No. 8,572,831 on Nov. 5, 2013, which is the National Stage filing under 35 U.S.C. §371 of PCT Application Ser. No. PCT/US10/37575 filed on Jun. 7, 2010. The disclosures of the U.S. Patent Application and the PCT Application are hereby incorporated by reference in their entireties.

BACKGROUND

Unless otherwise indicated herein, the materials described in this section are not prior art to the claims in this application and are not admitted to be prior art by inclusion in this section.

Along with advances in electronics and mechanical sciences, progress in material science has resulted in a worldwide consumer economy, where billions of assembled items exchange hands every day. Electronic devices are an illustrative example of consumer goods that include many different materials such as various metal parts, plastics, and similar components integrated through different assembly mechanisms. While many such items are designed with reliability, ergonomics, power consumption, and comparable parameters in mind, environmental considerations are increasingly playing a role in the design of electronic devices and other assembled goods. Recyclability is one of the environmental considerations in designing consumer goods.

The present disclosure appreciates that there are several limitations with recycling. For example, a typical electronic device may contain a number of dissimilar materials, which may require distinct recycling processes. Since components of assembled items are typically attached in a variety of ways, disassembling them prior to recycling may be a time consuming task. Moreover, due to a variety of assembled item sizes and types, it may be difficult to automate the disassembly process at a recycling location, where many different types of items may be processed. Mechanical methods such as crushing and separating may result in mixing of materials reducing the efficiency of the recycling process.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or materials related to inductively removing assembly bonding.

Briefly stated, inductive elements may be placed strategically at bonding locations between two or more coupled components. At disassembly time, the elements may be heated through Radio Frequency (RF) energy causing the bonds to break and components to separate. For example, inductive elements placed near plastic stake bonds between dissimilar materials in an electronic device may be employed to separate the dissimilar materials during a recycling process. According to some embodiments, the elements may also be heated through a directly applied electric current via a network of connections designed into the assembly.

Figure 1:
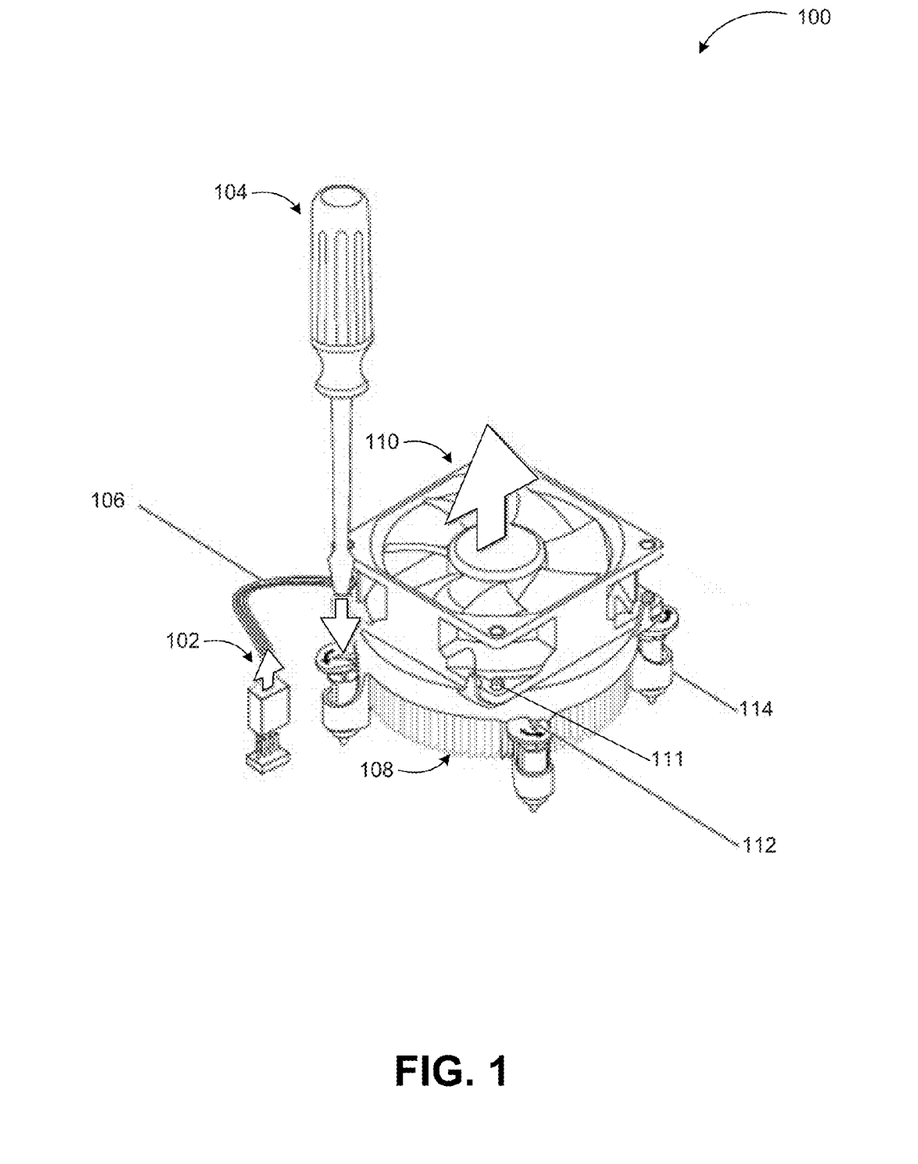
FIG. 1 illustrates disassembly of a cooling fan as an example implementation for some embodiments.

FIG. 1 illustrates disassembly of a cooling fan as an example implementation for some embodiments that are arranged in accordance with the present disclosure. Embodiments may be implemented in any assembled product comprising mechanically connected components. Electronic devices are one category of assembled products, which typically have a variety of components made from dissimilar materials that are connected through different mechanisms (e.g., mechanical connections, chemical bonding, solder connections, and/or similar ones).

Different components of an item such as the cooling fan assembly of diagram 100 may be connected through staking, which creates an interference fit between two or more pieces. Typically, one of the pieces may have a hole and the other may have a boss that fits within the hole. A tight fit may be used for robustness. A staking punch may then be used to compress the boss radially to create the interference fit between the pieces forming a permanent joint. Alternatively, the boss may be a separate piece (not an integrated part of one of the components) that is inserted into matching holes in the components and compressed in opposing directions to connect the components.

Another approach for forming a bond between different components is thermoplastic staking, also known as heat staking. In thermoplastic staking, heat is used to deform the plastic boss. A stud protruding from the hole in one component (or from both matching holes in case of separate boss) may be deformed through softening and/or alteration of the stake material forming a head (or two heads) and mechanically locking the two components together. Mechanical or thermoplastic staking enables joining of dissimilar materials such as plastic, metal, ceramic, and/or comparable ones and eliminates a need for mechanical or similar assembly and disassembly techniques.

The cooling fan assembly shown in diagram 100 may include a fan 110, which may be made from plastic, ceramic, and/or metal. Fan 110 may be connected to cooling element 108 (e.g., a heat sink apparatus) through mechanical connection (screws 112, 114, etc.). The fan assembly may also include an electrical connection through cable 106 and connector 102, which may include different plastics and metal (wires). The cooling fan assembly may be assembled and disassembled manually using a screw driver 104, which is a time consuming task.

According to at least some embodiments, one or more inductive heating elements may be embedded into the staking bosses 111 enabling efficient disassembly of the connected components through application of RF energy to the heating elements. According to other embodiments, the inductive heating elements may be selected and positioned such that the staking bosses 111 may be deformed creating the connection through the use of the heating elements first and later deformed again (through softening and/or alteration of the stake material) destroying the connections through the use of the heating elements again. For example, the staking bosses 111 may be heated up to a predefined temperature or for a predefined period of time to allow the head(s) to form during assembly. During disassembly, the temperature and/or the heating time may be selected such that the formed heads are melted or broken severing the connections. According to further embodiments, an electrical network may be embedded into the assembly of components such that electrical current may be provided to the heating elements directly instead of RF induced heat.

Thus, the screw based connections (112, 114) in the cooling fan assembly may be replaced with heating element embedded stakes allowing assembly and/or disassembly of the components through RF energy application.

Figure 2:
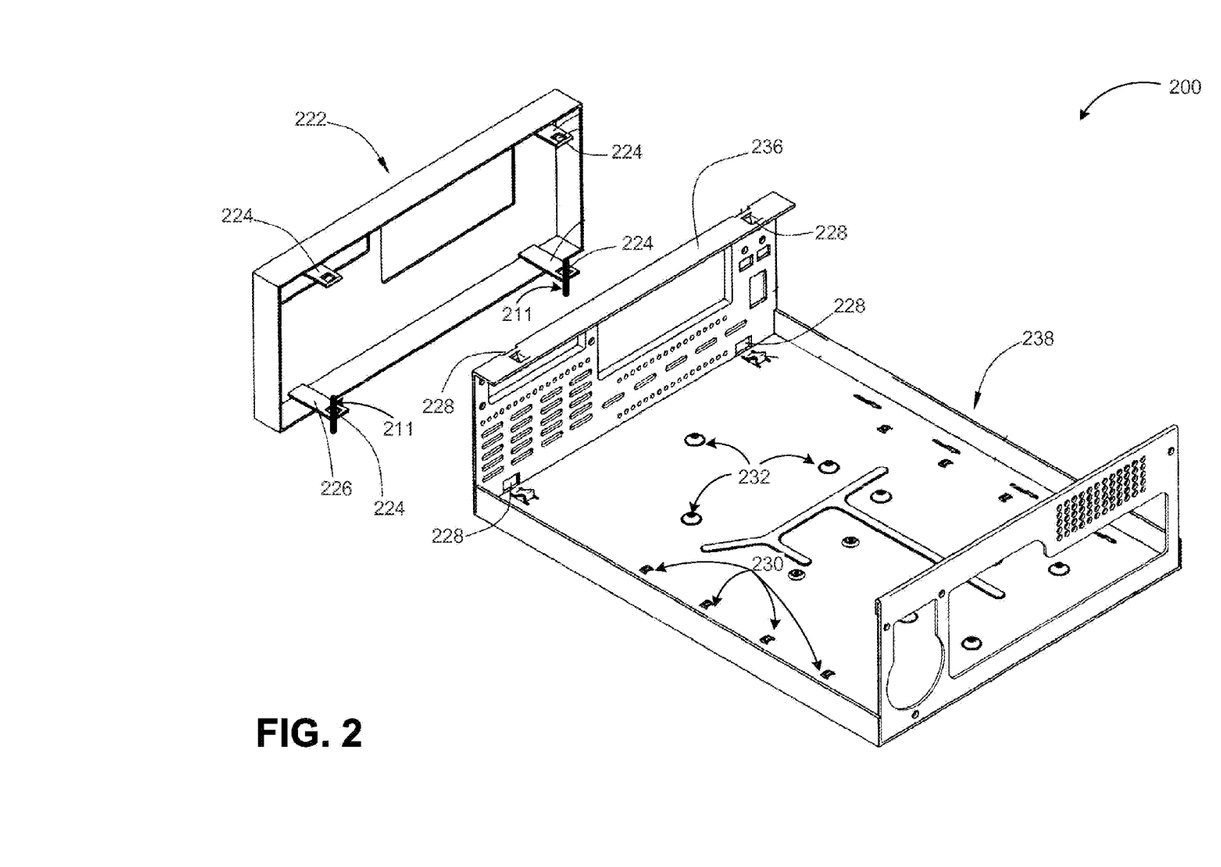
FIG. 2 illustrates a desktop computer enclosure where bonding with inductively heated elements may be implemented.

FIG. 2 illustrates a desktop computer enclosure where bonding with inductively heated elements may be implemented in accordance with at least some embodiments described herein. As mentioned previously, computers are an illustrative example of assembled products with a variety of components. In recycling computers, a majority of time may be spent manually or automatically disassembling the components. In a typical computer, not only are different components made from dissimilar materials, but some components themselves may comprise various materials as well.

In the computer enclosure 200, the front cover 222 may be attached to the main enclosure piece 238 through multiple protrusions 226. Each of the protrusions 226 may include a hole 224, which may overlap in an assembled position with a corresponding hole 228 on a front part 236 of the main enclosure piece 238. An inductive heating element embedded stake 211 may be placed through the hole-pair and deformed to establish a robust attachment as discussed above.

The main enclosure piece 238 may include a number of different holes 230 and 232 of varying sizes and shapes for attachment of additional components through a similar method. The connections may also be established through plastic (or similar) bosses chemically or otherwise attached (e.g., glued) to the main enclosure piece 238. These bosses may be protruded through holes in the components and staked employing any of the staking methods described above.

Figure 3:
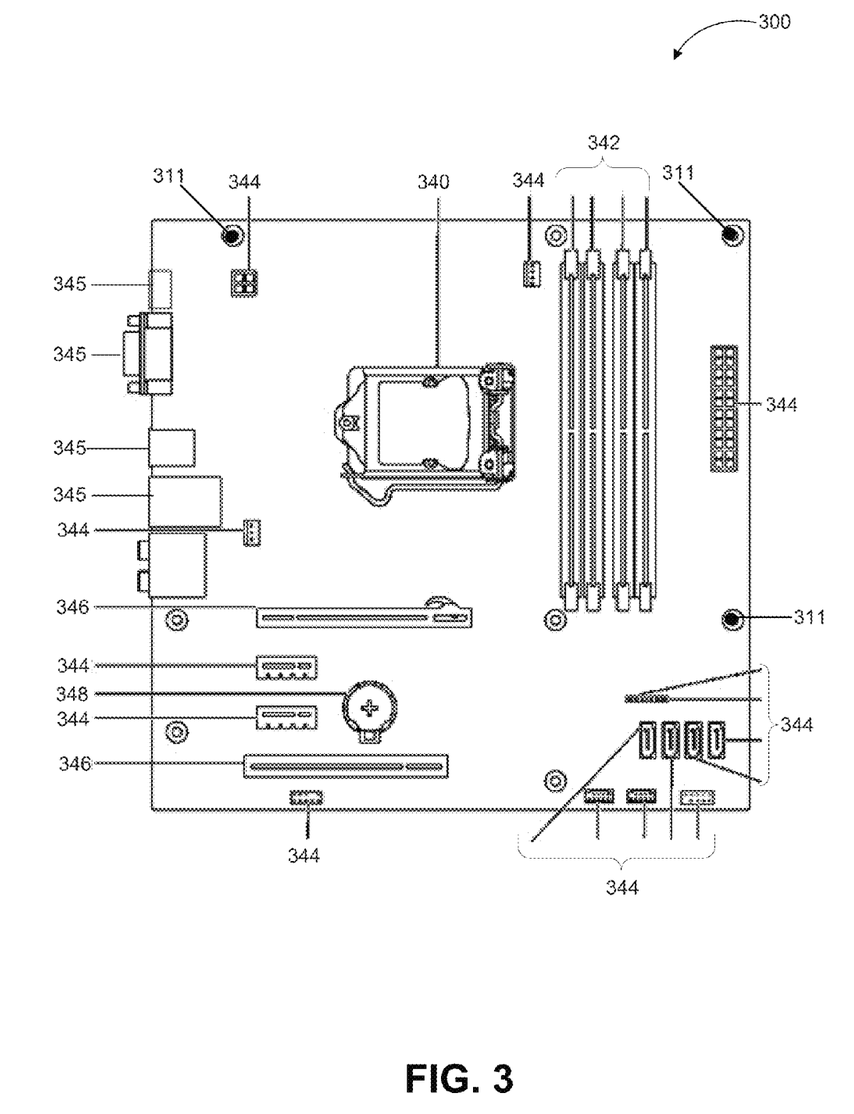
FIG. 3 illustrates a computing device circuit board with a variety of materials, where bonding with inductively heated elements may be implemented according to some embodiments to separate the materials at disassembly.

FIG. 3 illustrates a computing device circuit board with a variety of materials, where bonding with inductively heated elements may be implemented according to some embodiments described herein to separate the materials at disassembly. Circuit board 300 may include a number of electrical and/or mechanical components or subassemblies. Each of the components or subassemblies attached to the circuit board 300 may comprise a single type of material or include a plurality of materials. CPU socket 340 is an example of a multi-material subassembly made of different materials such as metals and plastic.

Memory connectors 342, card connectors 346, and/or other connectors 344 may be made of plastic, while shielded connectors 345 may include a combination of metal and plastic. Circuit board 300 may also include an on-board battery 348. When recycling circuit board 300, disassembly time may be reduced through the use of heating element embedded stakes (e.g., 311) connecting the circuit board to the individual components. The assembly may be subjected to a predefined RF field sufficient to heat the embedded heating elements such that the stakes (e.g., 311) soften or melt and the connections can be severed through mechanical or otherwise agitation (e.g., magnetic separation of ferromagnetic parts).

Similar to the above described process, circuit board 300 may be prepared with heating element embedded stakes (e.g., 311) at assembly time and the stakes (e.g., 311) deformed through the application of an RF field just enough to form a robust attachment. The above discussed processes may be applied to the entire circuit board 300 or to a portion of it through a multi-step procedure. For example, sensitive and/or reusable components such as CPU socket 340 may be removed manually. Then, the circuit board may be disassembled as discussed above.

Figure 4:
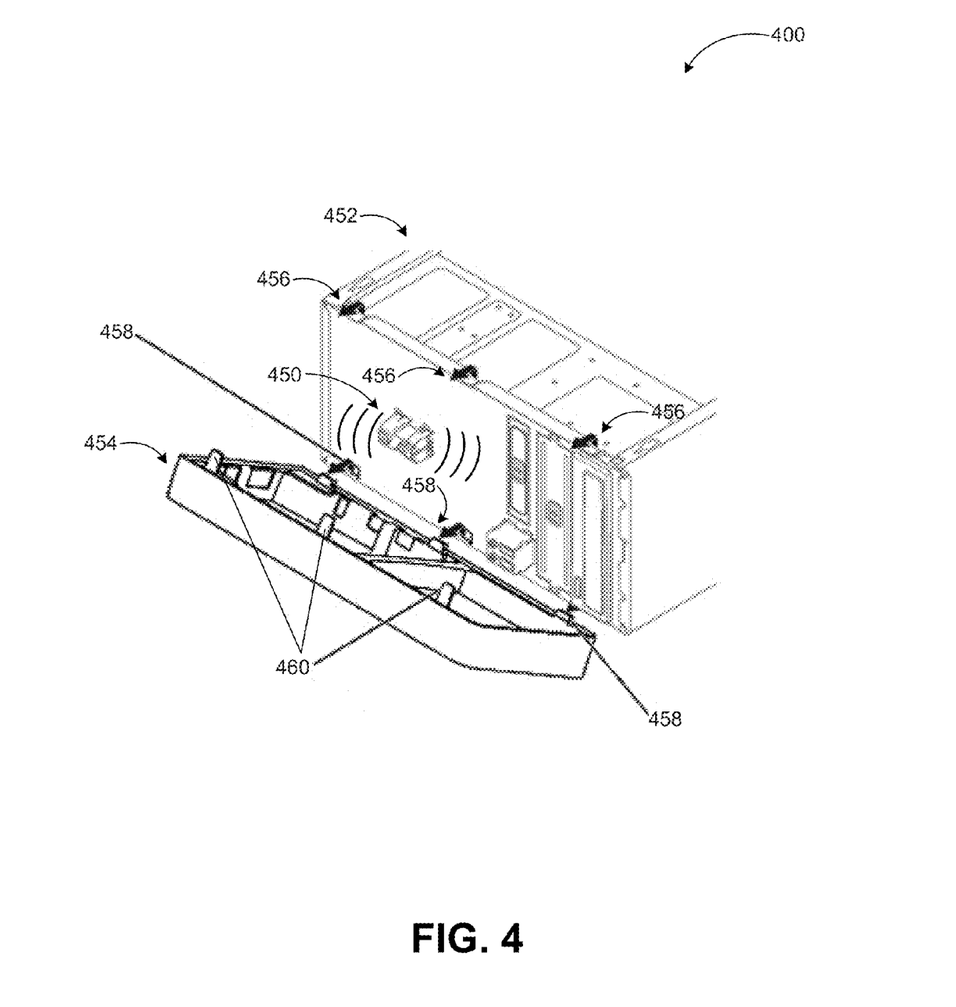
FIG. 4 illustrates how a front cover of a desktop computer may be separated from the enclosure of the same device through bonding stakes with inductively heated elements.

FIG. 4 illustrates how a front cover of a desktop computer may be separated from the enclosure of the same device through bonding stakes with inductively heated elements. An assembly/disassembly method according to some of the embodiments may also be utilized in a self-disassembly application.

Computer assembly 400 is an example self-disassembly implementation. While an RF energy source for disassembling products may be placed in a recycling facility (as discussed later) in order to disassemble a multitude of products cost-efficiently, such RF energy source may also be built in into the products according to some embodiments. Thus, an RF energy source 450 may be placed in a strategic location within the enclosure and activated at disassembly time (e.g., through an on-board switch). Different components of the computer assembly 400 may be attached using heating element embedded stakes 460, which may soften or melt when the RF energy source 450 is activated and allow self-disassembly of the computer.

In addition to utilizing the above described mechanism for total disassembly, RF energy source 450 may also be placed in a particular location such that only a designated component is detached. For example, RF energy source 450 may be placed between the front cover 454 and main enclosure 452 of the computer assembly 400, which are connected through stake/hole pairs (460/456) and hinges 458. When activated the RF field from the RF energy source 450 may soften or melt the bonds between the front cover 454 and the main enclosure 452 allowing the front cover 454 to separate from the main enclosure 452.

Figure 5:
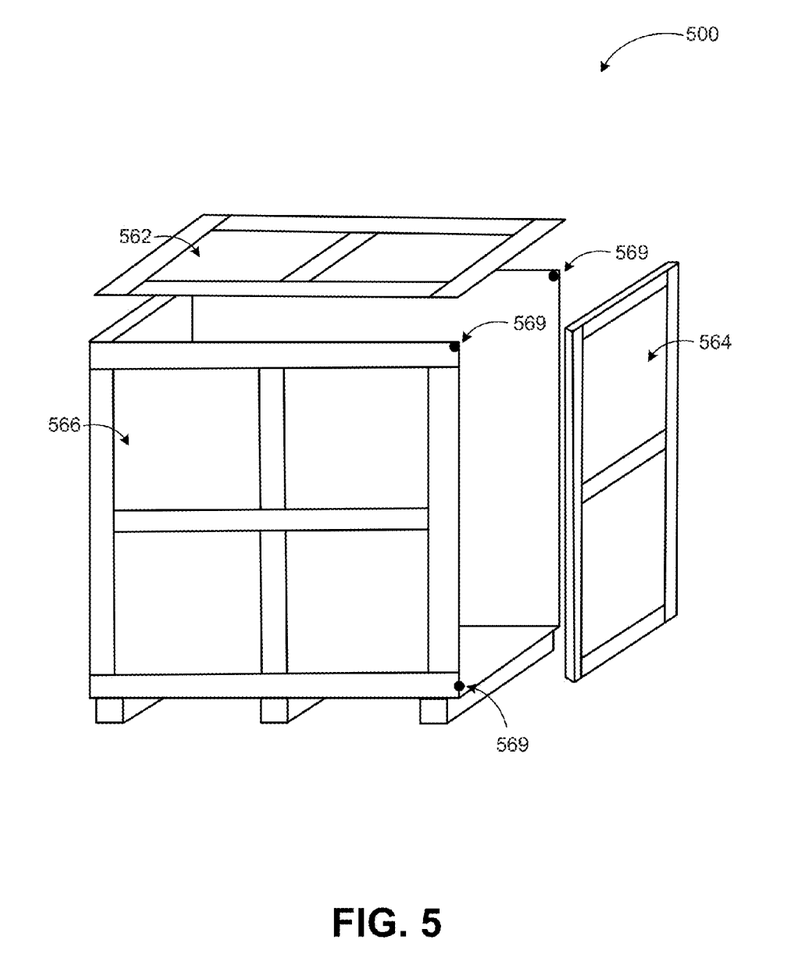
FIG. 5 illustrates a packing crate that may be easily disassembled with strategically placed inductive heating elements at attachment locations.

FIG. 5 illustrates a packing crate 500 that may be easily disassembled with strategically placed inductive heating elements at attachment locations in accordance with at least some embodiments described herein. As mentioned previously, a heating element embedded staking based attachment method is not limited to computers or other electrical devices, but can be implemented in any assembly environment. Packing crates are another illustrative example. According a further example, the embedded inductively heatable elements with the described heating/disassembly functionality may be combined with Radio Frequency Identification (RFID) technology. RFID functionality may be designed into the same elements for sorting, tamper-proofing and/or tracking of the different materials or parts (electronic parts, top/bottom of crate, etc.) whether for assembly, disassembly, recycling, etc.

A packing crate according to at least some of the embodiments may be assembled and/or disassembled employing heating element embedded stakes 569 between the walls 562, 564, and 566 of the crate. At assembly time, the walls 562, 564, and 566 may be held together mechanically and an RF field applied at sufficient strength (and/or for a sufficient time) to deform the stakes 569 for a robust attachment. At disassembly time, a stronger field or a longer application period may be used to soften or melt the stakes 569 for prompt disassembly of the packing crate 500. Alternatively, a weaker field and/or shorter application period may be employed based on position of the packing crate and/or application of external forces (e.g., a mechanical pull force on the crate walls). Following the example of FIG. 4, the RF energy source may be placed inside or outside of the packing crate 500 making the crate self-assembling and/or self-disassembling.

Figure 6:
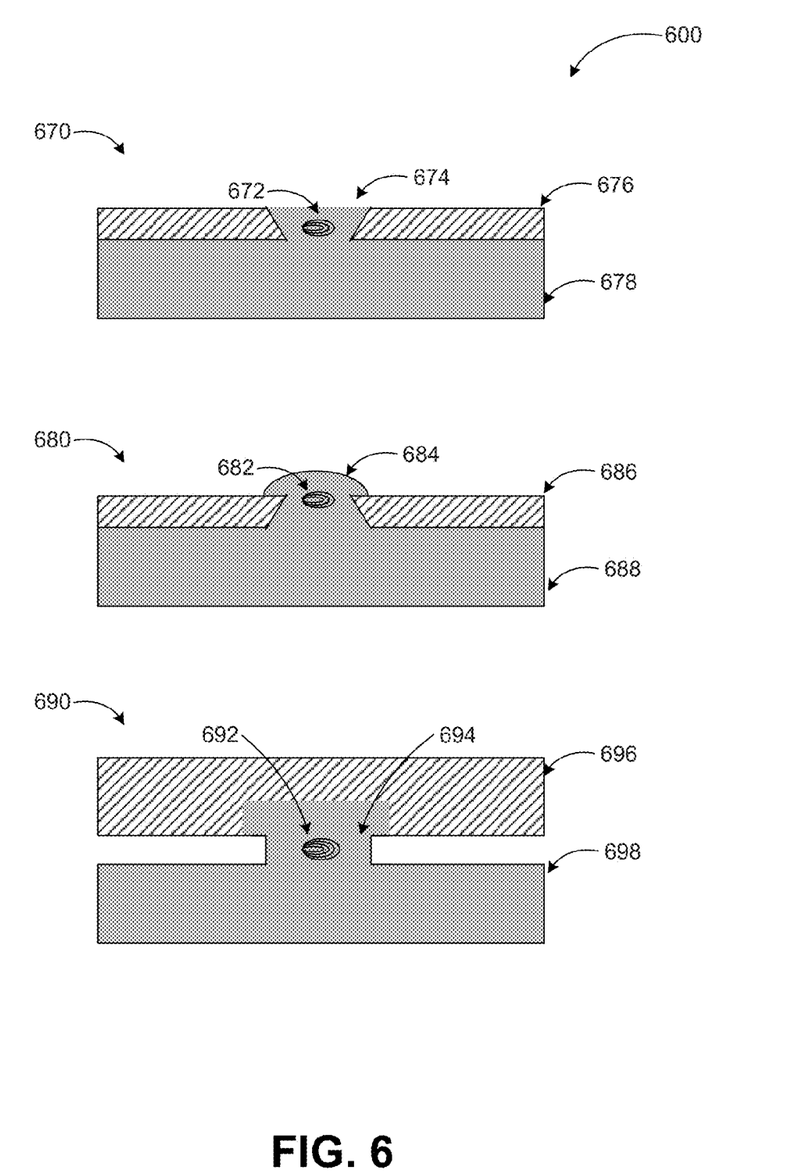
FIG. 6 illustrates examples of plastic staking based bonding types, where inductive heating elements may be used to break the assembly bonding.

FIG. 6 illustrates examples of plastic staking based bonding types, where inductive heating elements may be used to break the assembly bonding in accordance with at least some embodiments described herein. While the example illustrations in diagram 600 are directed to disassembly of connections between dissimilar materials through inductive heating elements, such elements may also be employed to create the connections by heating a plastic (or other material) boss sufficiently to form the stakes as discussed previously.

The example stakes 674, 684, and 694 in assemblies 670, 680, and 690 create an interference fit or similar connection between two dissimilar materials. In the example assemblies of diagram 600, stakes 674, 684, and 694 are an integral part of the lower materials 678, 688, and 698 (e.g., plastic). According to other embodiments, the stakes may be formed using deformable bosses that fit through holes in both materials. In each case, an inductively heatable element 672, 682, and 692 is embedded into the stake. Of course, more than one element may also be used. The elements may be any size or shape as discussed in more detail below. The stakes may be deformed during assembly forming a flush (674), a dome (684), or an internal bond (694) (example of non-interference fit), respectively, between lower and upper element pairs 678/676, 688/686, and 698/696. At disassembly time, the inductive elements may be heated by application of an RF field softening or melting the stakes and thereby separating the two dissimilar materials.

The attachments may be formed through mechanical compression staking, hot air staking, ultrasonic staking, direct contact heat staking, and/or infrared staking. The attached materials may be any material including, but not limited to, plastic, metal, ceramic, and/or comparable materials. The stakes may be made from any form of deformable material such as plastics, polymers, ceramics, and/or composites.

Figure 7:
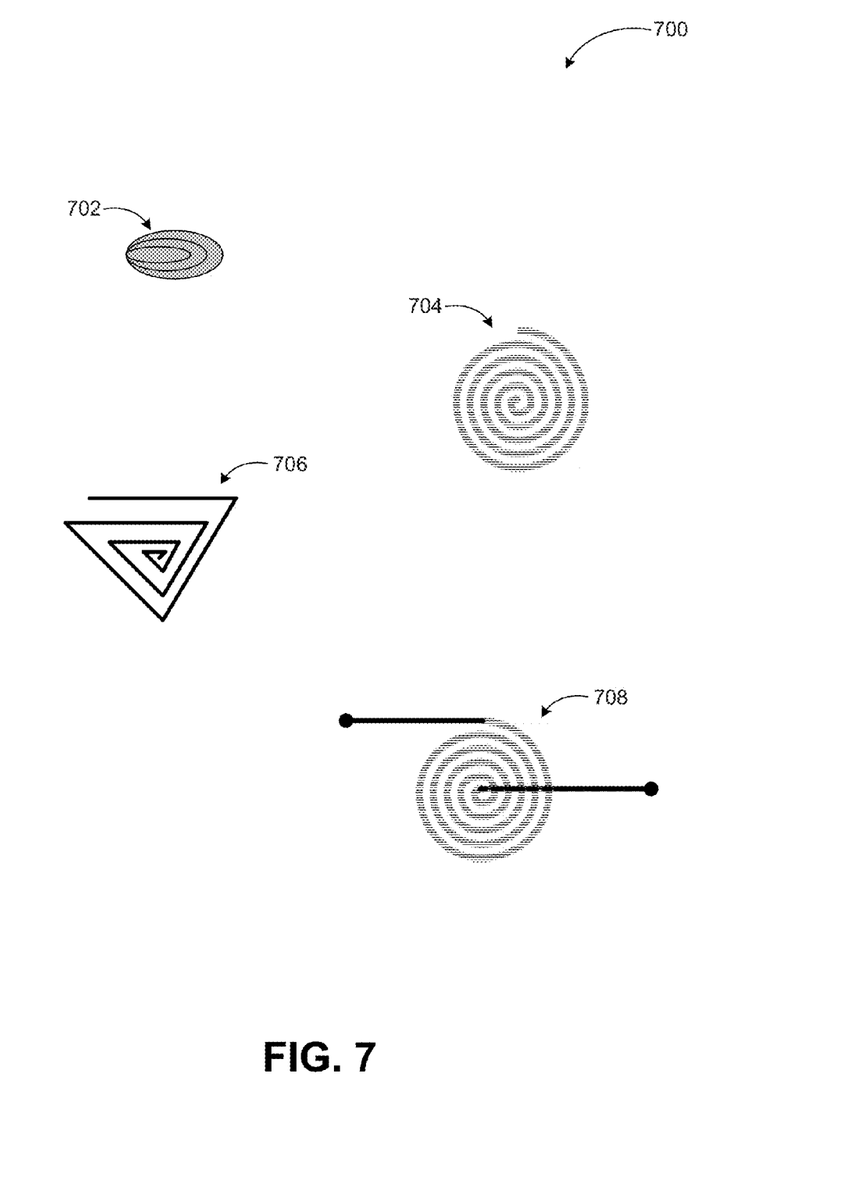
FIG. 7 illustrates several example inductive heating elements according to some embodiments.

FIG. 7 illustrates several example inductive heating elements according to some embodiments of the present disclosure. Inductive heating elements in an attachment system according to at least some embodiments may be made from any inductively excitable material such as metals or metal embedded ceramics. As illustrated by the example elements 702, 704, 706, and 708 of diagram 700, the elements may be formed in various shapes and sizes to fit a physical shape and/or size of the stakes as well as the heat that needs to be generated to soften or melt the stake. Some example shapes may include a round spiral (704), an elliptical spiral (702), or an angled spiral like a triangle (706). Of course, other shapes or forms may also be employed. Other parameters that may be selected based on stake size, type, material (as well as RF energy to be applied) may include a thickness (diameter) and number of windings of the elements.

Since inductive heating also depends on the resistive characteristics of the excited material, a type of material to manufacture the elements may also be selected according to stake parameters. For example, highly resistive composite materials such as siliconized carbon fibers may be used to manufacture small heating elements for small stake applications, while larger pure metal elements may be used in larger bonding applications. Heating element 708 is an example of direct electrical contact heating. As discussed previously, a network of electrical connections may be designed into assembled products providing the energy directly to the heating elements instead of via an RF field according to at least some embodiments.

Figure 8:
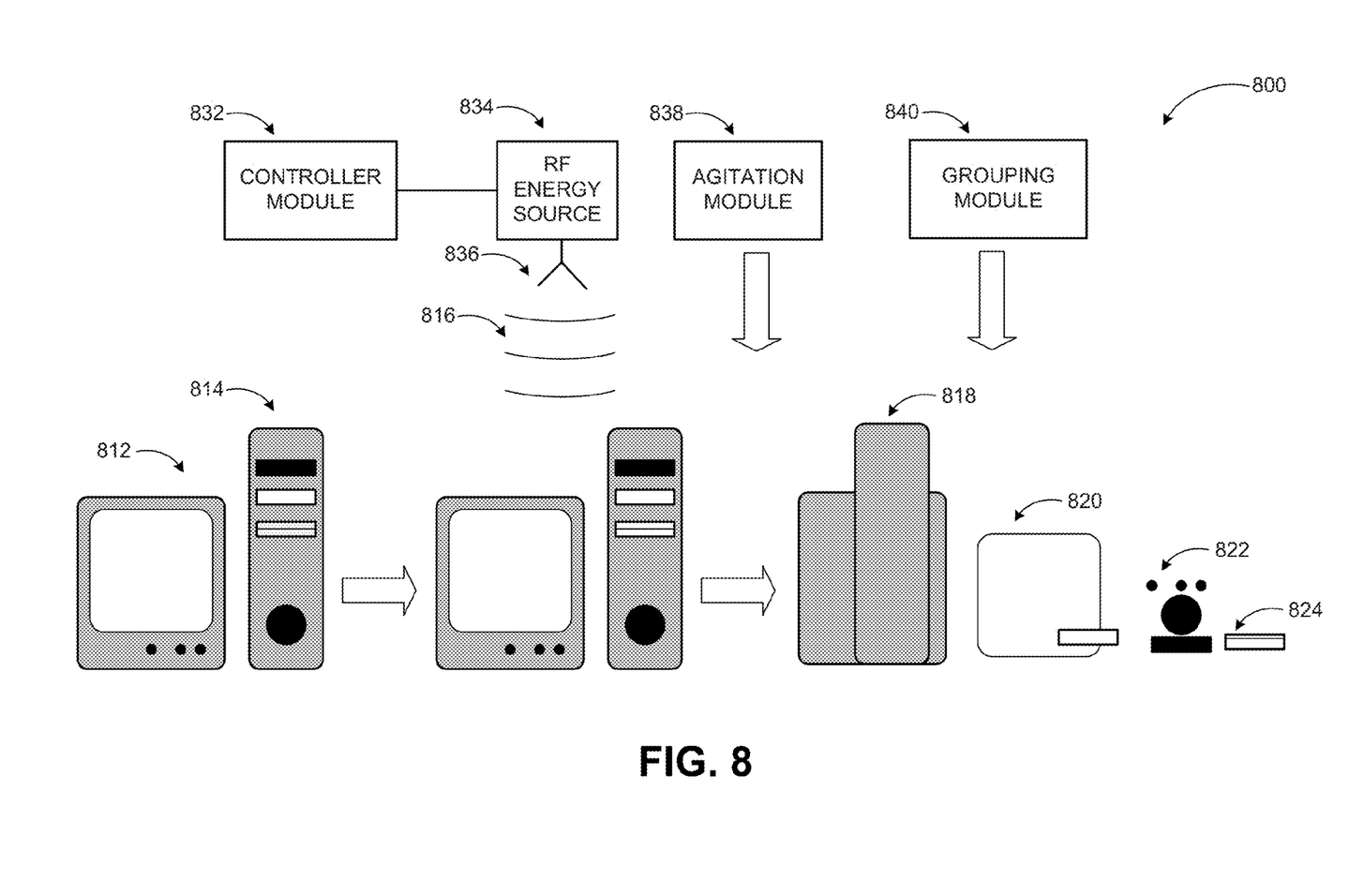
FIG. 8 illustrates a conceptual diagram of disassembling computing devices at a recycle facility in accordance with at least some embodiments described herein.

FIG. 8 illustrates a conceptual diagram 800 of disassembling computing devices at a recycle facility in accordance with at least some embodiments described herein. Disassembly of computing devices may be a time consuming task using conventional attachment technologies. Various components made from dissimilar materials may have to be separated through manual and/or automated tasks such as removing screws and pivots, unsoldering soldered parts, and similar operations.

However, a computing device assembled through a mechanism according to some embodiments such as computer 814 and monitor 812 may be subjected to an RF field 816, which causes the attachments between different components to be severed through inductively heating embedded elements in bonding stakes. The assemblies may be subjected to mechanical or otherwise agitation such as shaking, spinning, or magnetic field agitation (i.e., separation of ferro-magnetic materials through application of a magnetic field). This in return may result in separation of dissimilar materials 818, 820, 822, and 824.

The disassembly process may be partially or fully automated reducing the time needed to disassemble the computing devices through the use of inductive heating element embedded stakes. For example, an automated system may include controller module 832, which may determine a level and/or duration of RF field to be generated for heating the embedded elements. Additionally, a position of an antenna 836 for an RF energy source 834 may also be determined dynamically by the controller module 832. RF energy source 834 may be configured (e.g., via controller module 832) to radiate the computing devices (e.g., 812, 814) with generated RF field 816 through antenna 836 and cause the stake joints to be severed. An agitation module 838 may be configured (e.g., via controller module 832) to separate the detached components through mechanical, magnetic, or similar agitation. The separated components may then be grouped manually or through an automated process controlled by grouping module 840.

While embodiments have been discussed above using specific examples for assemblies, components, materials, and configurations, they are intended to provide a general guideline to be used for inductively removable assembly bonding. These examples do not constitute a limitation on the embodiments, which may be implemented using other components, materials, heating elements, and configurations using the principles described herein.

Example embodiments may also include methods. These methods can be implemented in any number of ways, including the structures described herein. One such way is by machine operations of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 9:
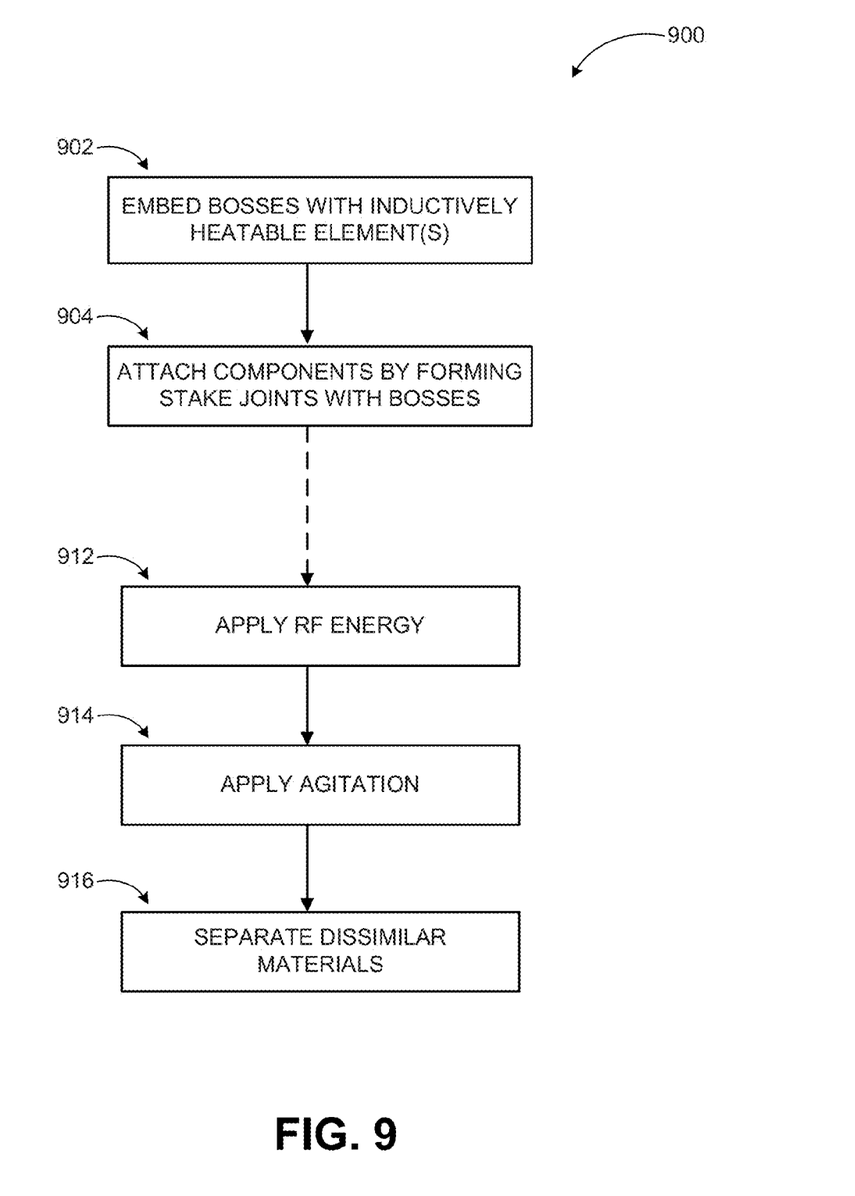
FIG. 9 is a flow diagram illustrating an example method that may be performed for assembling and disassembling items with inductive heating element using embedded bonding that is arranged in accordance with at least some embodiments described herein.

FIG. 9 is a flow diagram illustrating an example method that may be performed for assembling and disassembling items with inductive heating element using embedded bonding that is arranged in accordance with at least some embodiments described herein. The operations described in blocks 902 and 904 may be performed during assembly of an item comprising two or more components, while blocks 912 through 916 may be implemented at disassembly time by an automated disassembly facility or equipment. The process may be controlled by a computing device or dedicated controller, in which case, the operations of process 900 may be stored as computer-executable instructions in a computer-readable medium.

A process of disassembling items with inductive heating element embedded bonding may begin at assembly time with operation 902, "EMBED BOSSES WITH INDUCTIVELY HEATABLE ELEMENT(S)". At operation 902, bosses of various sizes, shapes, materials may be embedded with heating elements while the bosses are formed in a plastic forming machine or similar devices as discussed above.

Operation 902 may be followed by operation 904, "ATTACH COMPONENTS BY FORMING STAKE JOINTS WITH BOSSES". At operation 904, the embedded bosses may be inserted into aligned holes in the components to be attached by an automatic positioning machine and then deformed through a variety of methods creating the stake joints such as controlled RF energy heating provided by an RF source like RF energy source 834 of FIG. 8. Different methods of creating stake joints and types of stake joints are discussed in conjunction with FIG. 6.

The disassembly portion of the process 900 may begin with operation 912. "APPLY RF ENERGY". At operation 912, RF energy may be applied to the item to be disassembled by RF energy source 834. The level of the RF energy may be determined by controller module 832 based on a type and size of the heating elements; size, shape, and/or type of stakes to be softened/melted; a distance of the item to the RF energy source; safety considerations; and comparable parameters. The duration of the applied RF energy may also be adjusted by the controller module 832 based on similar considerations as with the level of the applied RF energy. In some examples, the applied RF energy level may be applied in accordance with a shaped waveform where the energy level changes over a predetermined time interval such as a pulse waveform, a square-wave waveform, a ramp waveform (i.e., ramp up or ramp down), a triangle waveform (i.e. ramp up and down), a sine-wave waveform, or some other variety of waveform shape, which may be either repeating (i.e. periodic) or non-repeating. In some examples, the applied RF energy may correspond to substantially a single RF frequency, a limited set of RF frequencies, and/or a swept range of RF frequency.

Operation 912 may be followed by operation 914, "APPLY AGITATION." At operation 904, the item with its bonds weakened or removed may be subjected to mechanical or other agitation by agitation module 838 to separate dissimilar materials from each other. The agitation may be accomplished with periodic or aperiodic waveforms such as vibration in a pattern of pulses with varying frequency, varying time, varying pattern (e.g., pulse followed by ramp, followed by frequency sweep, etc.).

Operation 914 may be followed by operation 916, "SEPARATE DISSIMILAR MATERIALS." At operation 916, the disassembled materials may be further separated and/or collected according to their type by grouping module 840. For example, plastics of certain weight may be separated from other types of plastics. Similarly, metals may be separated from plastics and/or ceramics, and so on.

The operations included in the above described process are for illustration purposes. Disassembling items assembled through inductive heating element embedded bonding stakes may be implemented by similar processes with fewer or additional operations. In some examples, the operations may be performed in a different order. In some other examples, various operations may be eliminated. In still other examples, various operations may be divided into additional operations, or combined together into fewer operations.

There is little distinction left between hardware and software implementations of aspects of systems implementing assembly or disassembly methods like the ones described above. The use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the processes according to the subject matter described herein may be implemented via Application Specific Integrated Circuits (ASICs). Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the processes according to the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g. a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing destruction of bonds in assembled products, temperature levels in stakes, and similar ones).

A typical assembly or disassembly system may be implemented utilizing any suitable commercially available components, such as those typically found in recycling or manufacturing systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system to facilitate disassembly of an item that includes two or more attached components, the system comprising:
   a controller module adapted to determine one or more of a level and/or a duration for application of RF energy to the item that includes two or more attached components, wherein the two or more attached components are attached through stake joints embedded with inductors that are configured to generate heat reactive to the RF energy such that the stake joints are deformed;
   an RF energy source adapted to wirelessly apply the RF energy to the item such that the stake joints deform in response to the RF energy; and
   an agitation module adapted to agitate the item such that the components are detached after the stake joints deform in response to the RF energy.

2. The system according to claim 1, further comprising:
   a grouping module adapted to group a plurality of separated components made of dissimilar materials in respective groups.

3. The system according to claim 1, wherein the RF energy source is adapted to at least one of:
   generate an RF field directed at the item; and
   apply an RF current to a network of connections embedded into the item connecting to individual inductors.

4. The system according to claim 1, wherein the inductors are coils, and wherein one or more of: a size, a material, a shape, and/or a thickness of the inductors s determined based on one or of: a size, a shape, a material, and/or a thickness of bosses employed to form the stake joints.

5. The system according to claim 1, wherein the stake joints include one or more of plastic, polymer, ceramic, and a composite material.

6. The system according to claim 5, wherein one or more of: a size, a material, a shape, and/or a thickness of an inductor is determined based on one or more of: a size, a shape, a material, and/or a thickness of a stake joint to which the inductor is embedded.

7. The system according to claim 5, wherein at least a portion of the stake joints are embedded with a plurality of inductors.

8. The system according to claim 1, wherein the controller module is further adapted to:
   adjust one or more of the level, a frequency, and/or the duration of the RF energy based on one or more of: a material, a shape, and/or a thickness of the inductors in an assembled item and one or more of: a size, a shape, a material, and/or a thickness of the stake joints in the assembled item.

9. The system according to claim 1, wherein the agitation module is adapted to agitate the item through one or more of mechanical agitation and/or magnetic agitation.

10. The system according to claim 1, wherein the system is part of a recycling facility.

11. The system according to claim 1, wherein
   a plurality of embedded bosses are positioned to fit into holes in the components; and
   a second RF energy is applied to the item such that the embedded bosses are deformed creating a stake joint between the components, wherein the stake joint is deformable in response to a first RF energy, which is different from the second RF energy.

12. The system according to claim 1, wherein the components are further attached to the item by one or more of:
   aligning holes in two or more components and inserting a boss to the holes for a tight fit; and
   aligning holes in one or more components with a boss integrated into another component and inserting the boss to the holes for a tight fit.

13. The system according to claim 1, wherein the RF energy is applied to the item by generating an RF field.

14. The system according to claim 13, wherein a watt form of the RF field is adjusted based on a predefined period, wherein the waveform includes one or more of a pulse waveform, a square-wave waveform, a ramp up waveform, a ramp down waveform, a triangle waveform, and/or a sine-wave waveform.

15. The system according to claim 13, wherein a waveform of the RF field is adjusted based on safety considerations.

16. The system according to claim 13, wherein the RF field is generated from a source that is coupled to an assembled item.

* * * * *

UNITED STATES PATENT AND TRADEMARK OFFICE
CERTIFICATE OF CORRECTION

PATENT NO. : 9,266,201 B2  
APPLICATION NO. : 14/043836  
DATED : February 23, 2016  
INVENTOR(S) : Kruglick et al.

Page 1 of 1

It is certified that error appears in the above-identified patent and that said Letters Patent is hereby corrected as shown below:

In The Specification

In Column 1, Line 7, delete "§121" and insert -- § 121 --, therefor.

In Column 1, Line 11, delete "§371" and insert -- § 371 --, therefor.

In Column 4, Line 64, delete "disassembly. RF" and insert -- disassembly, RF --, therefor.

In Column 8, Line 66, delete "(ASICs)." and insert -- (ASICs), --, therefor.

In Column 9, Line 43, delete "(e.g." and insert -- (e.g., --, therefor.

In Column 10, Line 65, delete "B together. A" and insert -- B together, A --, therefor.

In The Claims

In Column 12, Line 8, in Claim 4, delete "inductors s" and insert -- inductors is --, therefor.

In Column 12, Line 9, in Claim 4, delete "one or of:" and insert -- one or more of: --, therefor.

In Column 12, Line 12, in Claim 5, delete "one or more of" and insert -- one or more of: --, therefor.

In Column 12, Lines 25-26, in Claim 8, delete "a material," and insert -- a size, a material, --, therefor.

In Column 12, Line 52, in Claim 14, delete "a watt" and insert -- a waveform --, therefor.

Signed and Sealed this  
Seventh Day of June, 2016

Michelle K. Lee  
*Director of the United States Patent and Trademark Office*